(12) United States Patent
Moon

(10) Patent No.: US 9,612,622 B2
(45) Date of Patent: Apr. 4, 2017

(54) ELECTRONIC DEVICE HOUSING

(71) Applicant: Apple Inc., Cupertino, CA (US)

(72) Inventor: Minhyung (Kevin) Moon, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 14/276,850

(22) Filed: May 13, 2014

(65) Prior Publication Data
US 2015/0331456 A1    Nov. 19, 2015

(51) Int. Cl.
*G06F 1/16*    (2006.01)
*H02H 6/00*    (2006.01)
*H02H 7/20*    (2006.01)

(52) U.S. Cl.
CPC .............. *G06F 1/1656* (2013.01); *H02H 6/00* (2013.01); *H02H 7/20* (2013.01); *G06F 2200/1633* (2013.01); *Y10T 29/49004* (2015.01)

(58) Field of Classification Search
CPC .......... G06F 1/1656; H02H 6/00; H02H 7/20; Y10T 29/49004
USPC ........................................................ 361/51
See application file for complete search history.

(56) References Cited

U.S. PATENT DOCUMENTS

| | | |
|---|---|---|
| 3,606,296 A | 9/1971 | Chassagne |
| 4,278,726 A | 7/1981 | Wieme |
| 4,849,580 A | 7/1989 | Reuter |
| 5,182,158 A | 1/1993 | Schaeffer |
| 5,349,893 A | 9/1994 | Dunn |
| 5,368,914 A | 11/1994 | Barrett |
| 5,426,562 A | 6/1995 | Morehouse et al. |
| 5,587,854 A | 12/1996 | Sato et al. |
| 5,606,341 A | 2/1997 | Aguilera |
| 5,659,376 A | 8/1997 | Uehara et al. |
| 5,666,261 A | 9/1997 | Aguilera |
| 5,783,297 A | 7/1998 | Wise et al. |
| 5,936,600 A | 8/1999 | Ohashi et al. |
| 5,965,249 A | 10/1999 | Sutton et al. |
| 5,982,617 A | 11/1999 | Haley et al. |
| 6,085,878 A | 7/2000 | Araki et al. |
| 6,154,360 A | 11/2000 | Kaczeus et al. |
| 6,251,493 B1 | 6/2001 | Johnson et al. |
| 6,262,888 B1 | 7/2001 | Siedow et al. |
| 6,288,489 B1 | 9/2001 | Isohata et al. |
| 6,324,054 B1 | 11/2001 | Chee et al. |
| 6,373,702 B2 | 4/2002 | Oishi et al. |
| 6,524,692 B1 | 2/2003 | Rosen |
| 6,596,976 B2 | 7/2003 | Lin et al. |
| 6,603,620 B1 | 8/2003 | Berding |

(Continued)

FOREIGN PATENT DOCUMENTS

| | | |
|---|---|---|
| CN | 202444711 | 9/2012 |
| CN | 203119975 | 8/2013 |

(Continued)

*Primary Examiner* — Thienvu Tran
*Assistant Examiner* — Kevin J Comber
(74) *Attorney, Agent, or Firm* — Zachary D. Hadd

(57) ABSTRACT

An anti-shock device is disclosed to protect a portable electronic device from impact on a hard surface. The device includes shock absorbers which may be deployed upon sensing a triggering event by an accelerometer. The shock absorbers may include bumpers of buoyant material to allow the portable electronic device to float if the device contacts a water surface.

17 Claims, 10 Drawing Sheets

(56) References Cited

U.S. PATENT DOCUMENTS

| | | |
|---|---|---|
| 6,627,818 B2 | 9/2003 | Kamel et al. |
| 6,633,481 B2 | 10/2003 | Pavol |
| 6,647,328 B2 | 11/2003 | Walker |
| 6,664,491 B2 | 12/2003 | Yanai et al. |
| 6,665,192 B2 | 12/2003 | Wimberger Friedl et al. |
| 6,701,529 B1 | 3/2004 | Rhoades et al. |
| 6,744,186 B2 | 6/2004 | Oishi et al. |
| 6,785,566 B1 * | 8/2004 | Irizarry ............... H04B 1/3888 455/575.1 |
| 6,809,916 B2 | 10/2004 | Nakata et al. |
| 6,859,357 B2 | 2/2005 | Morimoto et al. |
| 6,871,888 B2 | 3/2005 | Yamagiwa |
| 6,924,996 B2 | 8/2005 | Sugawara |
| 6,968,954 B2 | 11/2005 | Hsieh |
| 7,009,835 B2 | 3/2006 | Desai et al. |
| 7,059,182 B1 | 6/2006 | Ragner |
| 7,094,094 B2 | 8/2006 | Zahnen et al. |
| 7,113,351 B2 | 9/2006 | Hovanky |
| 7,133,281 B2 | 11/2006 | Bae |
| 7,167,360 B2 | 1/2007 | Inoue et al. |
| 7,259,357 B2 | 8/2007 | Walker |
| 7,260,885 B2 | 8/2007 | Albrecht et al. |
| 7,369,345 B1 | 5/2008 | Li et al. |
| 7,373,863 B2 | 5/2008 | O'Banion et al. |
| 7,382,567 B2 | 6/2008 | Liao et al. |
| 7,393,575 B2 | 7/2008 | Boss |
| 7,450,332 B2 | 11/2008 | Pasolini et al. |
| 7,463,436 B2 | 12/2008 | Takahashi et al. |
| 7,477,469 B2 | 1/2009 | Cook et al. |
| 7,492,544 B2 | 2/2009 | Jeansonne et al. |
| 7,532,478 B2 | 5/2009 | Jeong |
| 7,554,798 B2 | 6/2009 | Tanokuchi et al. |
| 7,568,942 B1 | 8/2009 | Lannon et al. |
| 7,612,994 B2 | 11/2009 | Ulrich et al. |
| 7,619,891 B2 | 11/2009 | Woo et al. |
| 7,643,243 B2 | 1/2010 | Lee et al. |
| 7,652,892 B2 | 1/2010 | Shiu et al. |
| 7,660,107 B2 | 2/2010 | Leung |
| 7,677,538 B2 | 3/2010 | Darnell et al. |
| 7,684,183 B2 | 3/2010 | Mori et al. |
| 7,760,289 B2 | 7/2010 | Nakanishi et al. |
| 7,817,373 B2 | 10/2010 | Choi et al. |
| 7,839,051 B2 | 11/2010 | Klinghult |
| 7,855,892 B2 | 12/2010 | Lin |
| 8,075,981 B2 | 12/2011 | Pearce et al. |
| 8,093,811 B2 | 1/2012 | Tanokuchi et al. |
| 8,106,789 B2 | 1/2012 | Yang et al. |
| 8,144,453 B2 | 3/2012 | Brown et al. |
| 8,189,280 B2 | 5/2012 | Ollila et al. |
| 8,190,015 B2 | 5/2012 | Li et al. |
| 8,248,777 B2 | 8/2012 | Prest |
| 8,289,689 B2 | 10/2012 | Chen et al. |
| 8,289,715 B2 | 10/2012 | Takahara |
| 8,297,601 B2 | 10/2012 | Vito et al. |
| 8,305,744 B2 | 11/2012 | Shedletsky et al. |
| 8,330,305 B2 | 12/2012 | Hart et al. |
| 8,352,077 B2 | 1/2013 | Goswami et al. |
| 8,411,432 B1 | 4/2013 | Zimlin et al. |
| 8,446,475 B2 | 5/2013 | Topliss et al. |
| 8,467,133 B2 | 6/2013 | Miller |
| 8,485,053 B2 | 7/2013 | Lee et al. |
| 8,503,121 B2 | 8/2013 | Osaka et al. |
| 8,564,424 B2 | 10/2013 | Evarts et al. |
| 2003/0168790 A1 | 9/2003 | Larson |
| 2005/0017396 A1 | 1/2005 | Pearce et al. |
| 2005/0264459 A1 * | 12/2005 | Tyler .................... G06F 1/1616 343/702 |
| 2006/0109581 A1 | 5/2006 | Lee et al. |
| 2008/0024972 A1 | 1/2008 | Yamaguchi |
| 2008/0091309 A1 | 4/2008 | Walker |
| 2008/0192124 A1 | 8/2008 | Nagasaki |
| 2009/0159408 A1 * | 6/2009 | Sunder ................ G11B 19/043 200/61.45 R |
| 2009/0273480 A1 | 11/2009 | Mittleman et al. |
| 2010/0149073 A1 | 6/2010 | Chaum et al. |
| 2010/0164152 A1 | 7/2010 | Li |
| 2010/0272969 A1 | 10/2010 | Taylor |
| 2011/0228460 A1 | 9/2011 | Kim et al. |
| 2011/0257765 A1 | 10/2011 | Evans et al. |
| 2012/0212484 A1 | 8/2012 | Haddick et al. |
| 2012/0212499 A1 | 8/2012 | Haddick et al. |
| 2013/0063885 A1 | 3/2013 | Shedletsky et al. |
| 2013/0073095 A1 | 3/2013 | King et al. |
| 2013/0077278 A1 | 3/2013 | Prest |
| 2013/0100591 A1 | 4/2013 | Montevirgen et al. |
| 2013/0127980 A1 | 5/2013 | Haddick et al. |
| 2013/0257582 A1 | 10/2013 | Rothkopf et al. |
| 2013/0278631 A1 | 10/2013 | Border et al. |
| 2013/0285490 A1 | 10/2013 | Rothkopf et al. |
| 2014/0066122 A1 | 3/2014 | Shukla et al. |
| 2014/0133072 A1 * | 5/2014 | Xiaozhuo ............ G06F 1/1656 361/679.01 |
| 2015/0318462 A1 | 11/2015 | Kim |
| 2015/0341070 A1 | 11/2015 | Sanford et al. |
| 2016/0018223 A1 | 1/2016 | Stryker et al. |

FOREIGN PATENT DOCUMENTS

| | | |
|---|---|---|
| GB | 1133198 | 11/1968 |
| JP | 2008067160 | 3/2008 |
| JP | 2009104407 | 5/2009 |
| JP | 2011099758 | 5/2011 |
| WO | WO2010/135421 | 11/2010 |

* cited by examiner

ELECTRONIC DEVICE HOUSING

TECHNICAL FIELD

The described embodiments relate generally to portable electronic devices. More particularly, the present embodiments relate to an improved housing for portable electronic devices to protect them from shock and other elements.

BACKGROUND

Portable electronic devices such as smartphones, tablets, laptop computers and the like have become ubiquitous in recent years. Users carry these devices while travelling in automobiles, on buses, trains, and on airplanes. Because users have grown accustomed to carrying these devices, many users carry these devices while engaging in strenuous activities such as running, climbing and the like. Because users are in possession of these devices in many environments, they are sometimes dropped or otherwise exposed to shock events involving rapid acceleration or deceleration. In addition, these devices may sometimes be exposed to elements such as water and may even be dropped into water environments such as a lake, ocean, or even a bathtub or sink within the home.

By subjecting the portable electronic devices to shock and environmental conditions such as those described above, users risk damage to the electronics in these devices and/or damage to the housing containing these electronics. Such damage can result in poor or no performance of the portable electronic device and/or diminution of the aesthetic appeal of the exterior of such devices. In a situation where the portable electronic device is dropped into water, the user may face a risk not only of irreparably damaging the device due to water ingress, but also of losing the device altogether as these devices will sink, and, depending upon the depth and clarity of the water, the portable electronic device may become unrecoverable.

Some modern portable electronic devices incorporate an accelerometer into the device for various purposes. An accelerometer is a device that can measure the force of acceleration, whether caused by gravity or by movement. Conceptually, an accelerometer behaves as a damped mass on a spring. When an accelerometer experiences a change in movement, the mass is displaced to the point that the spring is able to accelerate the mass at the same rate as the casing. The displacement is then measured to give the acceleration. An accelerometer can therefore measure the speed of movement of an object it is attached to. Piezoelectric, piezoresistive and capacitive components are commonly used to convert the mechanical motion into an electrical signal.

Because an accelerometer senses acceleration due to movement and gravity, the angle at which a device incorporating an accelerometer can be determined. Accelerometers are increasingly being incorporated into personal electronic devices to detect the orientation of the device, or portions of a device such as, for example, a display screen. The motion and angle of the device is noted by the sensors or a processing unit receiving information from the sensors, so the device can know the orientation of the screen with respect to a gravity vector.

SUMMARY

Embodiments described herein provide an improved housing for portable electronic devices to protect them in the event of an unexpected shock due to having been dropped by a user or in the event of having been dropped into a water environment. The improved housing includes shock absorbers which may be deployed to protect the device and the housing from damage due to an unexpected acceleration such as from having been dropped. In one embodiment, the shock absorbers are deployed from one or more corners of the devices in order to absorb the shock from the fall.

In another embodiment, the shock absorbers may include buoyant material which permits the portable electronic device to float in the event that it is dropped or otherwise exposed to a water environment. By enabling the device to float, this may permit the user time to retrieve the device from the water environment and prevent damage. In addition, by enabling the device to float, it is prevented from sinking to the bottom of a lake, ocean or other turbid waters where retrieval may be problematic.

In one embodiment, the shock absorbers on the portable electronic device are contained within the housing and only deployed when rapid acceleration is detected by an accelerometer within the portable electronic device indicating that the movement being experienced by the device is inadvertent due to a drop or other unforeseen event. The shock absorbers may be retractable such that, after deploying in the event of a drop, they may be retracted by a user into the housing and may be later deployed again if necessary. In another embodiment, the shock absorbers may include replaceable pads if the pads have deteriorated due to age or have become worn and less aesthetically pleasing to the user. In the event of a water landing, the user may decide to replace the pads for hygienic or other reasons.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a housing for a portable electronic device incorporating shock absorbers that automatically deploy when a particular acceleration event is detected, such as when the portable electronic device has been dropped. In order to prevent damage to the portable electronic device and, in particular to the housing, the housing includes shock absorbers that are deployed by an accelerometer that senses the dropping event. The shock absorbers may take the form of a variety of protrusions, projections, bumpers, and the like.

These and other embodiments are discussed below with reference to FIGS. 1-10. However, those skilled in the art will readily appreciate that the detailed description given herein with respect to these Figures is for explanatory purposes only and should not be construed as limiting.

Figure 1:
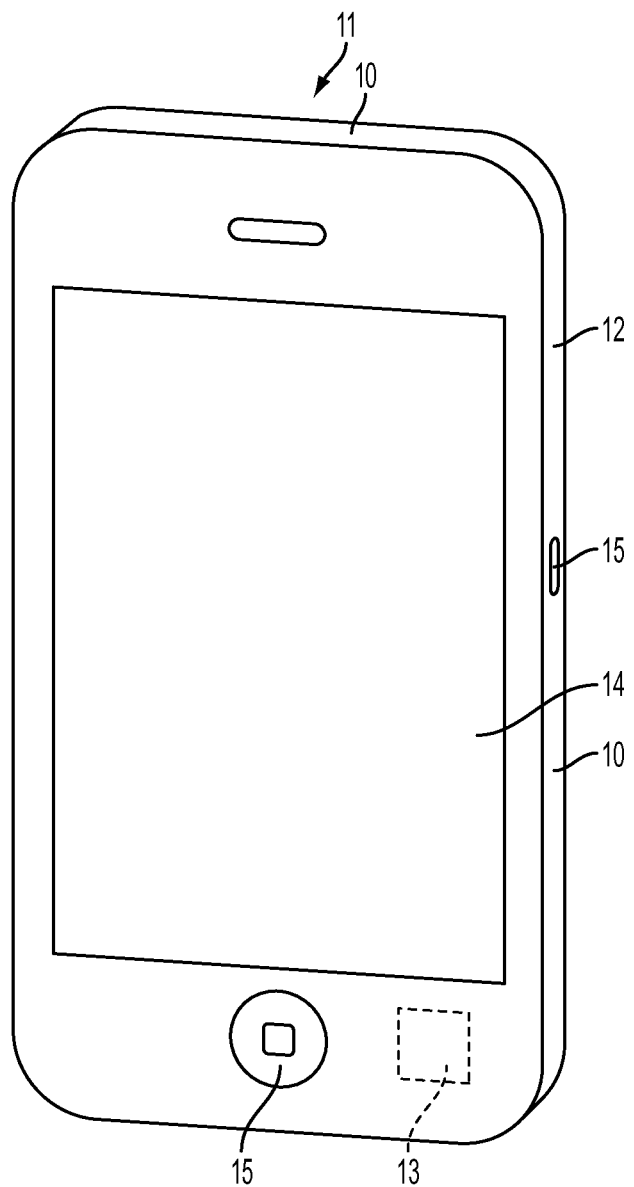
FIG. 1 shows a front perspective view of a smart phone.

FIG. 1 illustrates a conventional portable electronic device, here taking the form of a smartphone 11. As should be expressly understood, the portable electronic device could be a tablet, laptop, media player, wearable device or other portable electronic device as the embodiments disclosed herein are not limited to a smartphone but are described with respect to a smartphone for ease of illustration. Smartphone 11 includes a housing 12 and an accelerometer 13 which is contained within housing 12. Housing 12 also includes a screen 14 and various control inputs 15 adjacent screen 14 or along edges 10 as is known in the art. In one embodiment, accelerometer 13 may be a free fall sensor.

Figure 2:
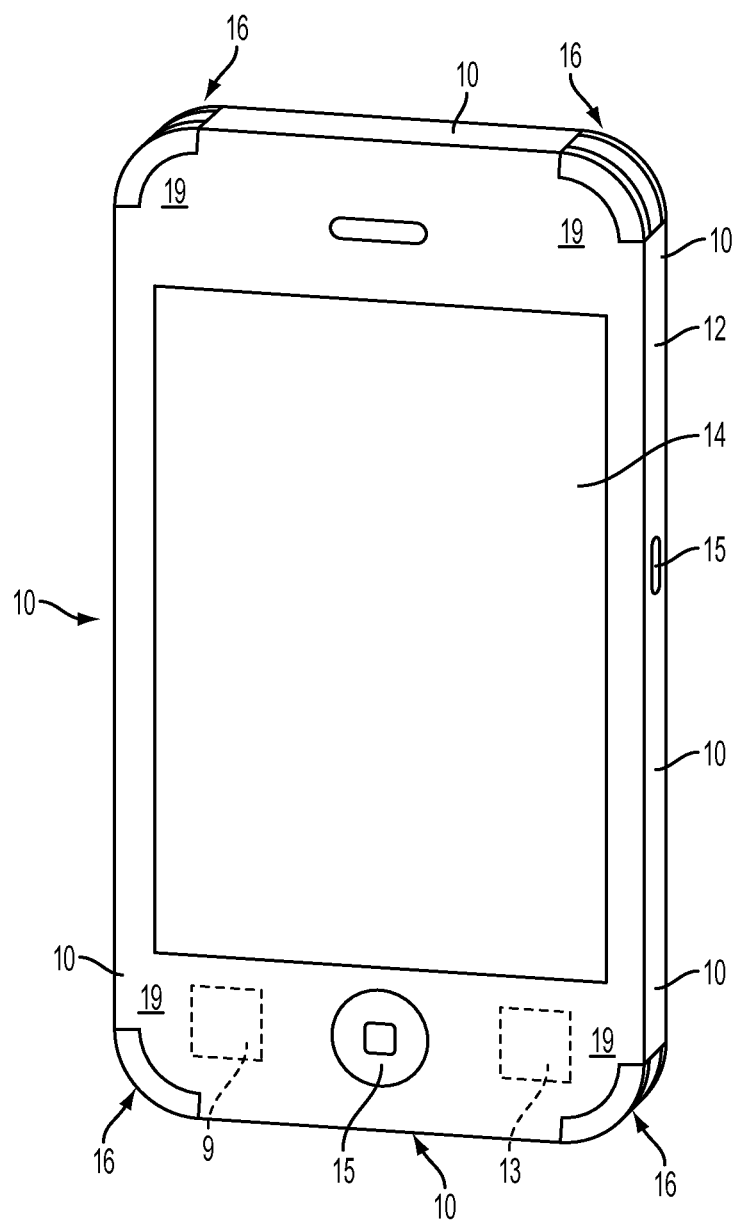
FIG. 2 shows a front perspective view of a smart phone in accordance with one embodiment, including shock absorbers in a retracted position.

In one particular embodiment, FIG. 2 illustrates a smartphone 11 which includes a housing 12, accelerometer 13, screen, 14 and controls 15 as with the smartphone of FIG. 1. However, smartphone 11 in FIG. 2 includes shock absorbers 16 located at the corners of housing 12. While shock absorbers 16 are preferably located at the corners 19 of housing 12, it should be expressly understood that shock absorbers 16 could be located along the edges 10 of housing 12 without departing from the scope of the embodiments described herein. Shock absorbers 16 could also be located adjacent screen 14 on the face and/or on the backside of housing 12 instead of along the edges 17 or corners 19 of housing 12. Shock absorbers 16 are shown in a retracted position in FIG. 2 but, as will be described herein, they have the capability to extend away from housing 12 in certain situations depending upon sensed conditions.

An accelerometer may be used as a free-fall sensor. One example free-fall sensor is used to detect if an attached device has been dropped and is falling. This device is included in the many common computer and consumer electronic products that are produced by a variety of manufacturers. The length of time in free fall may be used to calculate the height and velocity of movement and thus to make a determination whether the device has been dropped or merely set down by a user. Some portable electronic devices may turn themselves off if they sense a lack of movement for a predetermined length of time. Alternative sensors that may be used to detect free fall include gyroscopic sensors, magnetometers, cameras, microphones (for example, through echolocation in coordination with a speaker), and other sensors capable of determining at least one of motion, acceleration, and velocity. Certain sensors may also, or alternatively, detect a distance to an impact surface. Thus, references to an accelerometer herein should be understood to cover other types of sensors with suitable detection functionality, as well.

A control device 9 may execute instructions and carry out operations associated with portable electronic devices as are described herein. Using instructions from device memory, controller 9 may regulate the reception and manipulation of input and output data between components of the electronic device. Controller 9 may be implemented in a computer chip or chips. Various architectures can be used for controller 9 such as microprocessors, application specific integrated circuits (ASICs) and so forth. Controller 9 together with an operating system may execute computer code and manipulate data. The operating system may be a well-known system or a special purpose operating system or other systems as are known in the art. Control device 9 may include memory capability to store the operating system and data. Control device may also include application software to implement customized functions associated with the portable electronic device.

Figure 3:
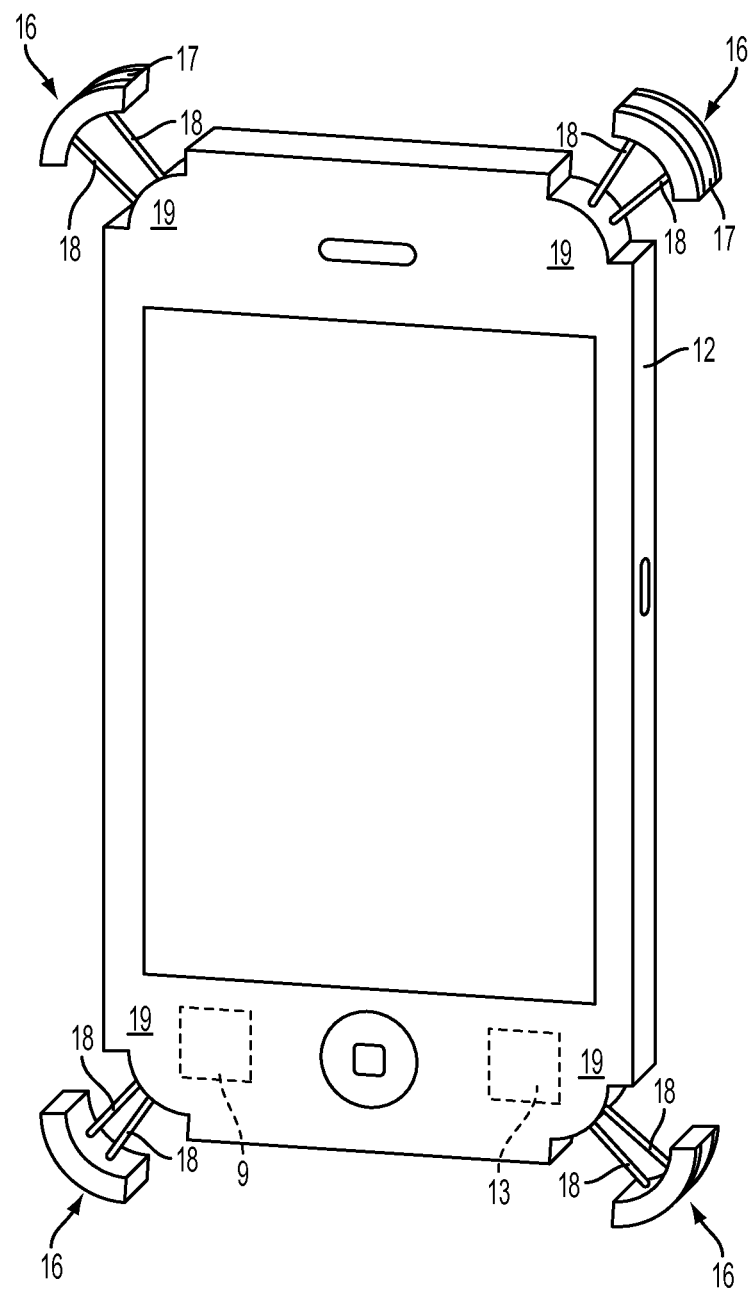
FIG. 3 shows a front perspective view of a smart phone in accordance with one embodiment, including shock absorbers in a deployed position.

Referring to FIG. 3, smartphone 11 is shown with shock absorbers 16 extended away from housing 12 in a deployed position. That is, shock absorbers 16 have been deployed by smartphone 11 due to a sensed condition by accelerometer 13 which has sensed that smartphone 11 has been dropped or otherwise subjected to an acceleration exceeding a threshold as will be described further herein. Shock absorbers 16 include a cover structure 17 which is connected to retractable supports 18 retractably connected to the four corners 19 of housing 12. Supports 18 may be spring loaded such that pressure exerted by a user on cover structure 17 toward the corner 19 of housing 12 will cause shock absorbers 16 to move toward corners 19. Thus, after deployment of shock absorbers, a user may manually retract shock absorbers 16 for re-use in the event of another triggering event. Additionally, it should be noted that the shock absorbers and related structure of this and other embodiments may be incorporated into a case or cover for an electronic device, instead of the device itself.

Figure 4:
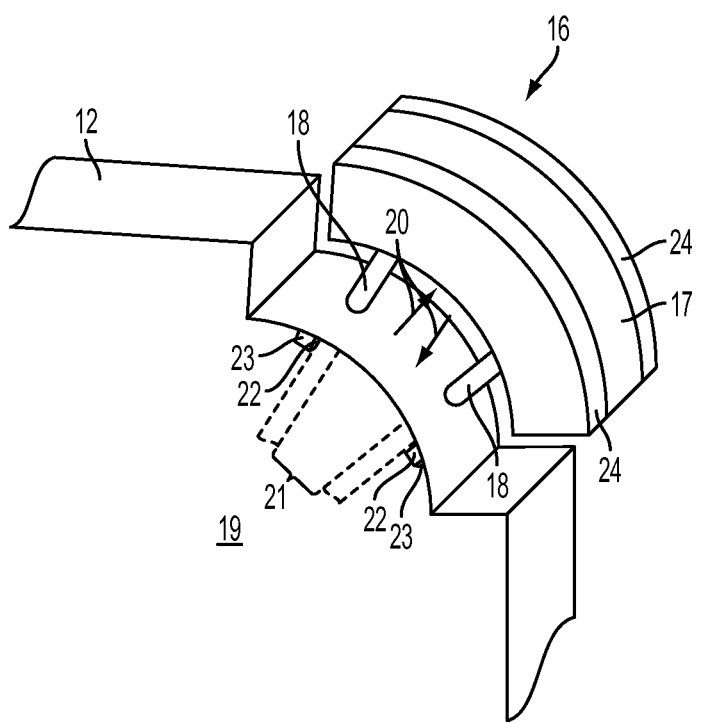
FIG. 4 shows a perspective view of a corner of a smartphone with a shock absorber in a deployed position.

Referring to FIG. 4, one corner 19 of smartphone housing 12 is shown in greater detail. Shock absorber 16 is shown in a deployed position extended from housing 12 by retractable supports 18. Shock absorbers 16 are moveable toward and away from housing 12 as indicated by arrows 20. Supports 18 may be made of rigid material with the capability to extend into and out of housing 12. Positions 21, shown in phantom in FIG. 4, show the position of rigid supports 18 when shock absorbers 16 are in a retracted position prior to being deployed. A detent 22 may engage supports 18 when in a retracted position to hold supports 18 inside of housing 12. When a deployment situation is sensed by accelerometer 13, detents 22 are moved away from supports 18 by a triggering switch 23 and a spring loaded force pushes supports 18 outward and away from housing 12 such that shock absorbers are in the deployed position shown in FIG. 4. In an alternate embodiment, supports 18 could be telescopic such that they do not extend into positions 21 in housing 12 but are located on the exterior of housing 12 at corners 19 and connected to triggering switch 23. Triggering switch 23 is connected to controller 9 which determines when a triggering event occurs due to a possible impact and then signals triggering switch 23 to deploy shock absorbers 16. In this embodiment, supports 18 are compressed when shock absorbers are in a retracted position to allow shock absorbers 16 to retract into corner 19. Bumper cushions 24 are shown adjacent to cover structure 17 as will be described further herein with respect to FIG. 5 and the other figures.

Figure 5:
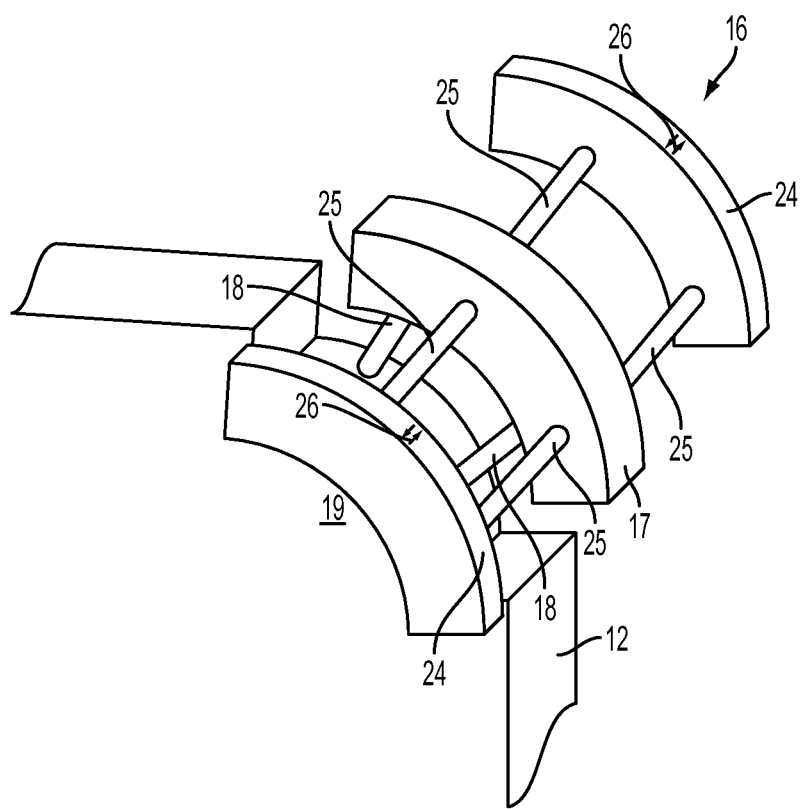
FIG. 5 shows a perspective view of a corner of a smartphone with a shock absorber in a deployed position and the pads extended.

Referring to FIG. 5, corner 19 of housing 12 is again shown as in FIG. 4 but with bumper cushions 24 extended from cover structure 17. Bumper cushions 24, as described previously, are retractably connected by spring-loaded rods 25 to cover structure 17. Bumper cushions 24 may thus move toward and away from cover structure 17 as indicated by arrows 26 such that, when triggering switch 23 deploys shock absorbers 16 in response to a signal from accelerometer 13, bumper cushions 24 extend away from cover structure 17 as shown in FIG. 5. Bumper cushions 24 will thus absorb at least a portion of the impact of smartphone 11 when smartphone 11 is dropped.

Bumper cushions 24 may be made from resilient foam, plastic, rubber, or other suitable cushioning material with sufficient resiliency to absorb the shock impact of smartphone 11 hitting a surface. In addition or alternatively, the spring-loaded rods 25 may absorb at least a portion of the energy generated by the device impacting a surface. In such an embodiment, the bumper cushions may be made of a stiff or rigid material. As yet another alternative, the bumper cushions 24 may be stiff or rigid and may be designed to crack or otherwise fail in the event of an impact, or the rods 25 may be so designed. The failure of the cushions and/or rods may absorb sufficient kinetic energy to avoid damaging the associated device (such as the smartphone).

In one embodiment, and as described below, bumper cushions 24 are made from a buoyant material such that smartphone 11 may be made to float if dropped or inadvertently placed into a water environment. In one embodiment, bumper cushions 24 may be removable from supports 25 such that they may be replaced if worn or wet or replacement is otherwise desired by a user. For example, in the event of a water landing, bumper cushions 24 may become wet and a user may decide to replace them or to remove them to allow them to dry apart from smartphone 11.

Bumper cushions 24 may be colored or otherwise configured in a decorative mode such that they add to the appearance of smartphone 11 or blend into the edge or body of the device, thereby making them less obtrusive.

As with supports 18 described above, rods 25 may be spring loaded such that when they are extended in the position shown in FIG. 5, they may also be retracted by a user in a direction indicated by arrows 26 toward cover structure 17. As with supports 18, in an alternate embodiment, rods 25 could be telescoping rods to allow manual retraction of pads 26 against cover structure 17 as was described above. A detent (which may be similar to detent 22), may secure rods 25 in a retracted position such that pads 26 are held in place against cover structure 17 as is shown in FIG. 4 in a non-deployed position. That is, upon receiving a signal from controller 9 in response to a triggering condition, triggering switch 23 releases detents 22 to allow cover structure 17 to move away from corner 19 and then allow bumper cushions 24 to slide out from cover structure 17 such that bumper cushions 24 receive the force of any impact of smartphone 11 with a surface instead of housing 12.

Figure 6:
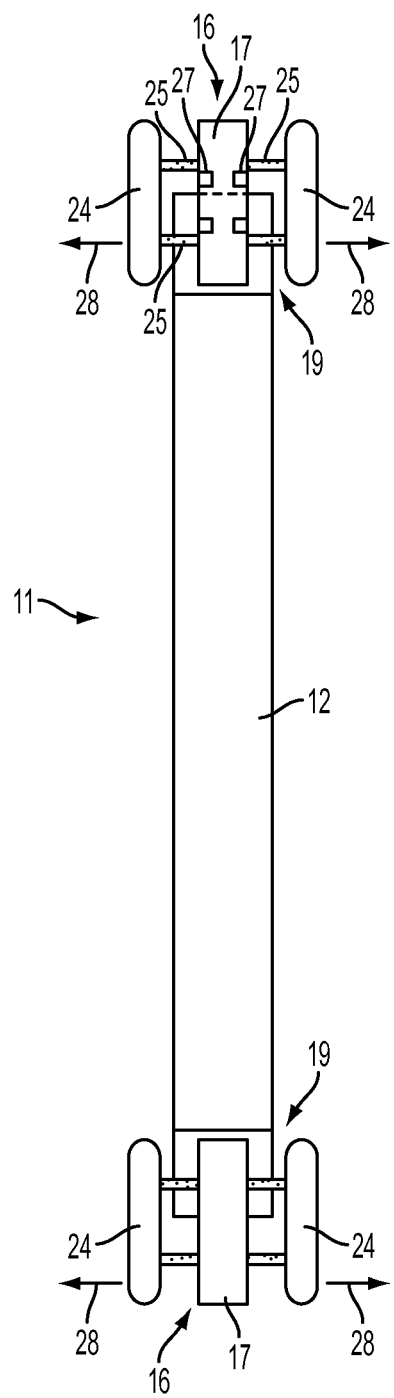
FIG. 6 shows a side view of a smartphone with shock absorbers extended and pads deployed.

Referring to FIG. 6, a side view of smartphone 11 is shown including housing 12. Shock absorbers 16 are shown in a fully deployed position away from corners 19. That is, cover structure 17 has moved away from corners 19 and bumper cushion pads 24 have moved away from cover structure 17 by the action of spring loaded rods 25 in the direction indicated by arrows. Detents 27 may be used to secure bumper pads 24 against cover structure 17 in a retracted position as shown in FIG. 2 but, upon receiving an activation signal from controller 9 in response to accelerometer 13, detents 27 are simultaneously or subsequently released allowing bumper pads 24 to be extended away from cover structure 17 in the direction indicated by arrows 28 into the position shown in FIGS. 5 and 6. In this position, shock absorbers 16 protect smartphone 11 and housing 12 from damage that may occur due to impacts with various surfaces.

Figure 7:
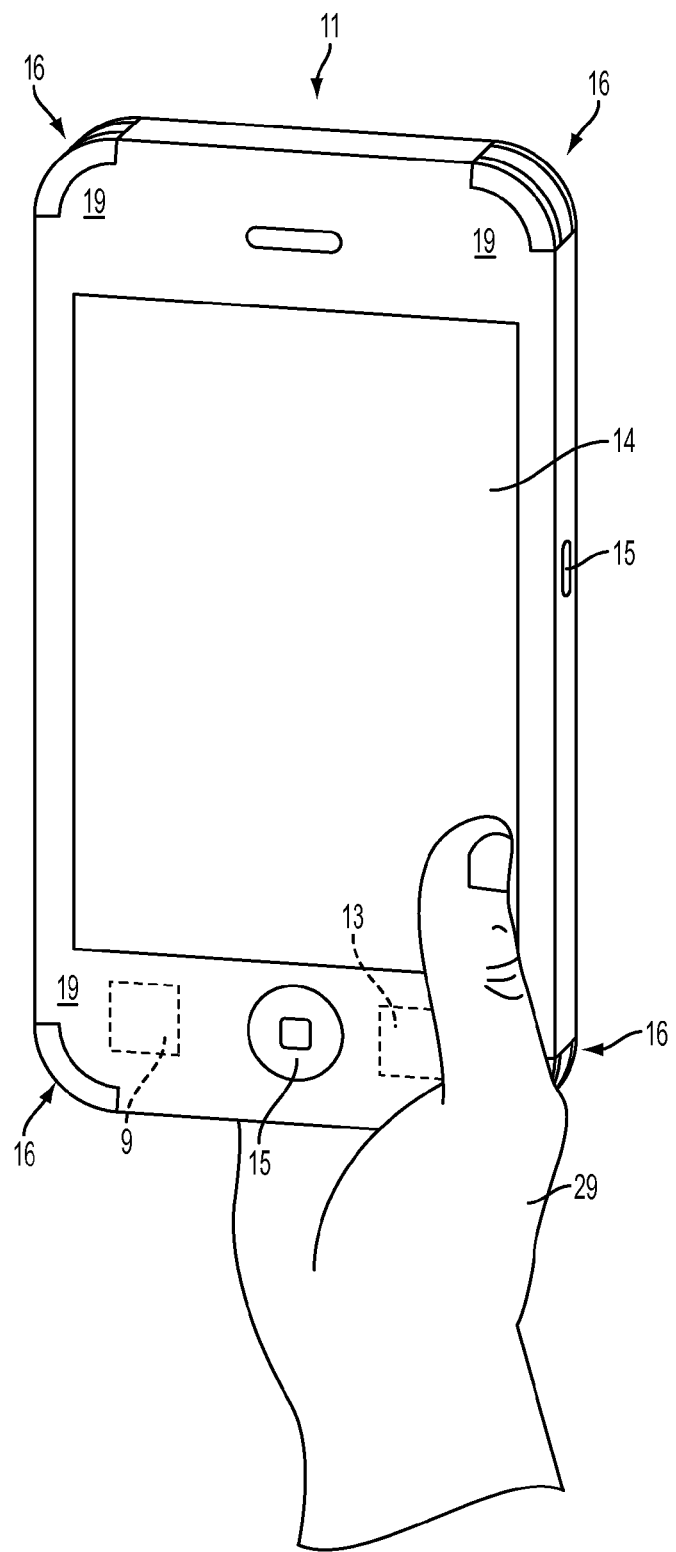
FIG. 7 shows a user holding a smartphone in accordance with one embodiment.

Referring to FIG. 7, a portable electronic device such as smartphone 11 is held in the hand of a user 29. User 29 may interact with smartphone 11 through screen 14 and controls 15 as is known in the art. Controller 9 and accelerometer 13 are contained within the housing 12 of smartphone 11. Smartphone 11 includes shock absorbers 16 located at the corners of housing 12. Shock absorbers 16 are shown in a retracted position in FIG. 7 but, as will be described above, they have the capability to extend away from housing 12 in certain situations depending upon sensed conditions. More particularly, shock absorbers 16 may be deployed if controller 9 determines that a triggering event has been sensed by accelerometer 13 as will be described below.

Figure 8:
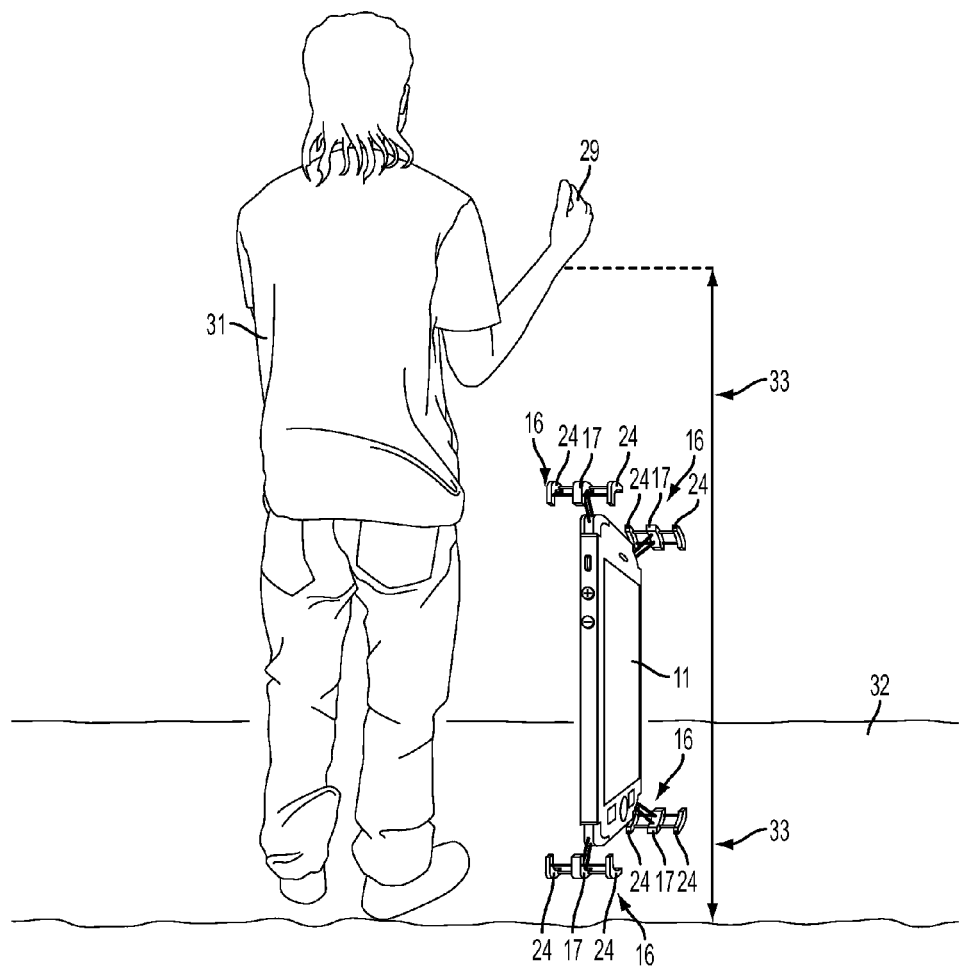
FIG. 8 shows a user dropping a smartphone and shock absorbers deployed with bumper cushions extended, with an expanded view of the smartphone that is not to scale.

Referring to FIG. 8, a user 31 is standing on a surface which may be a sidewalk 32. In this embodiment, user 31 has dropped smartphone 11 from his hand 29 and smartphone 11 is falling toward sidewalk 32. (For purposes of simplicity, the smartphone itself is shown as an in an expanded size in FIG. 8, so that various mechanisms of the device may be more clearly seen; the device is not to scale.) Accelerometer 13 in smartphone 11 has sensed this fall and shock absorbers 16 have been fully deployed as described above prior to smartphone 11 making contact with sidewalk 32. In one embodiment, controller 9 calculates the drop time sensed by accelerometer 13 as will be described herein. In the embodiment shown in FIG. 8, the distance from user's hand 29 to sidewalk 32 is approximately 1.5 meters as shown by arrows 33 in FIG. 8. The gravitational attraction between smartphone 11 and earth as represented by sidewalk 32 may be expressed by the equation $$S = Vt + \tfrac{1}{2} at^2,$$

where S is the travel distance (1.5 meters in this example) and V is the initial velocity (assumed to be zero in this example if hand 29 was stationary when smartphone 11 was dropped) and t is time. The symbol "a" is acceleration, which in this instance is the gravitational attraction of the earth or approximately 9.8 m/s$^2$. If the above equation is solved for time, then, assuming smartphone 11 was dropped from the 1.5 meter height 33, it will impact sidewalk 32 in about 0.55 seconds.

In one embodiment, smartphone 11 may include application software programming associated with controller 9 such that an activation signal is sent to deploy shock absorbers 16 when accelerometer senses an acceleration event exceeding a predetermined threshold. Thus, it may be determined, empirically that acceleration beyond a certain level may result in significant damage to housing 12 of smartphone 11 if a predetermined distance S is exceed or if accelerometer 13 detects acceleration for more than about one-half second in the embodiment described above. Whatever the predetermined threshold is, upon reaching that threshold, an activation signal is sent by controller 9 to triggering switch 23 to release detents 22 which permit spring loaded supports 18 to move cover structure 17 away from housing corners 19 of smartphone 11. Either simultaneously therewith, or prior or subsequent thereto, spring loaded supports 25 slide bumper cushions 24 away from cover structure 17 such that shock absorbers 16 are in their fully deployed position as shown in FIGS. 5, 6 and 8 prior to smartphone 11 striking surface 32.

Bumper cushions 24 will then absorb the impact of smartphone on surface 32 thereby protecting housing 12 and smartphone 11 from being damaged by the impact of smartphone 11 striking surface 32. In addition to protecting against a drop of smartphone 11 by user 31, shock absorbers 16 may also protect smartphone 11 in the event that user 31 throws smartphone 11 or if some other sudden movement of smartphone 11 for a predetermined time or distance is programmed in controller 9 to trigger deployment of shock absorbers 16.

Figure 9:
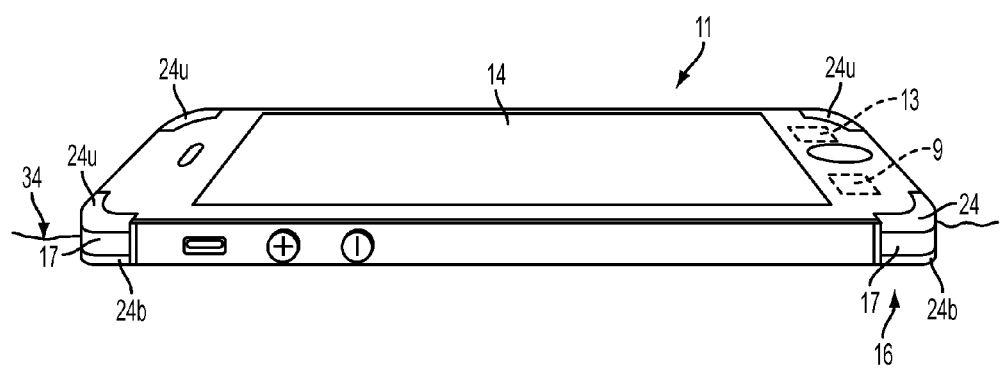
FIG. 9 shows a smartphone floating on water through operation of an embodiment described herein.

Referring to FIG. 9, smartphone 11 is shown floating on a liquid surface 34 which may be water. This water could be a lake, ocean, river or other naturally occurring liquid surface or it could be water in a bathtub, commode, sink or other container in a home or other environment. That is, in the event smartphone 11 comes into contact with surface 34, bumper cushions 24, which in one embodiment are made from buoyant material, cause smartphone 11 to float on liquid surface 34. In FIG. 9, shock absorbers 16 are shown in a retracted position as may be the case where accelerometer 13 in smartphone 11 has not detected a triggering event such as a drop from a predetermined distance as described in FIG. 8. If, smartphone 11 was dropped or otherwise propelled onto water surface 34 with sufficient speed, or for a sufficient time, such that a triggering event occurred, then shock absorbers 16 would have been deployed as described above with respect to FIGS. 5, 6 and 8 such that bumper cushions 24 and cover structure 17 would be extended away from corners 19 or housing 12. In this embodiment, only one set of bumper cushions 24 would be in contact with water surface 34. That is, in fully deployed position, bumper cushions 24 would separate away from cover structure 17 such that the 4 bumper cushions 24b (only 2 shown) are in contact with water surface 34 in the embodiment shown in FIG. 9. The upper bumper cushions, designated 24u in FIG. 9 may or may not be in contact with water surface 34 depending upon the buoyancy of bumper cushions 24 and the weight of smartphone 11. In the event that smartphone 11 was positioned on water surface 34 such that screen 14 was facing down, then bumper cushions 24u would be in contact with water surface 34 and bumper cushions 24b may or may not be in contact with water surface 34. In some embodiments, the bumper cushions may extend sufficiently far enough away from the smartphone body on one or both sides that the body does not contact the water or other liquid, presuming the water or other liquid is relatively placid.

Figure 10:
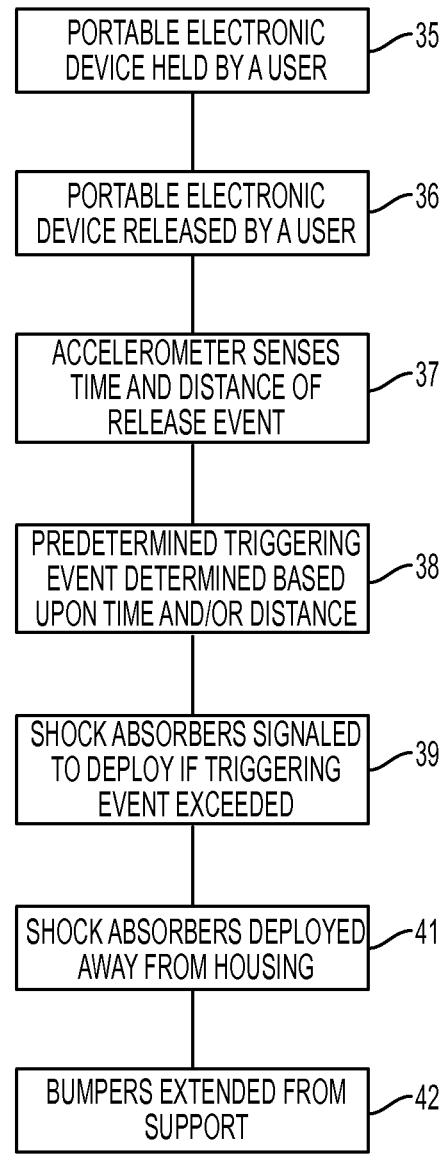
FIG. 10 is a flow chart of a method for protecting a portable electronic device.

Referring to FIG. 10, a flow chart of a method for protecting a smartphone is shown. In step 35, a portable electronic device 11 which may be a smartphone, tablet, media player, laptop computer or other device is held by a user. In step 36 the user inadvertently or otherwise drops or releases the portable electronic device 11. It should be appreciated that these two operations may not form any part of the method for protecting the device, but may instead trigger the various operations of the method, as described below with respect to steps 37 et. seq.

In step 37, an accelerometer 13 in the device senses movement and in step 38, the distance and time of the movement are calculated and compared to a predetermined triggering event by a controller. If the time or distance as calculated in step 38 exceeds the predetermined triggering threshold, then in step 39, an activation signal is sent by controller 9 to a triggering switch 23 or other instrument to deploy shock absorbers 16. In step 41 shock absorbers are moved away from housing 12 and in step 42, the bumper cushions slide away from the cover support. In one embodiment, steps 41 and 42 may occur simultaneously or, in another embodiment, step 42 occurs prior or subsequent to step 41.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A portable electronic device, comprising:
   a housing;
   shock absorbers mounted on supports that slide into and out of the housing, each of the shock absorbers comprising:
      a cover structure that forms an edge of the housing and that is mounted to the supports;
      additional supports mounted to the cover structure; and
      a bumper mounted to the additional supports, wherein the additional supports are configured to push the bumper away from cover structure;
   a sensor within the housing, the sensor configured to detect movement of the housing;
   a controller within the housing, the controller configured to determine a triggering event based upon the detected movement of the housing; and
   a switch coupled to the controller for deploying the shock absorbers based upon the triggering event determination.

2. The portable electronic device of claim 1 wherein the bumper is formed of resilient material.

3. The portable electronic device of claim 2 wherein the bumper is buoyant.

4. The portable electronic device of claim 1 wherein the sensor includes an accelerometer.

5. The portable electronic device of claim 1 wherein the controller determines the triggering event by determining a duration of the detected movement.

6. The portable electronic device of claim 1 wherein the supports are rigid.

7. The portable electronic device of claim 1 wherein the supports are spring-loaded and wherein the switch is activated based upon the triggering event determination, wherein the spring-loaded supports slide out of the housing in response to activation of the switch includes spring loaded supports.

8. The portable electronic device of claim 1 wherein the supports are telescoping supports.

9. The portable electronic device of claim 1 wherein the shock absorbers are configured to be retracted back into the housing after deploying.

10. The portable electronic device of claim 1 wherein the controller determines the triggering event by determining a distance of the detected movement.

11. A method for protecting a portable electronic device having a housing and shock absorbers mounted to the housing with retractable supports, the method comprising:
   sensing movement of the portable electronic device;
   comparing the sensed movement to a predetermined threshold; and deploying the shock absorbers from the housing in response to the sensed movement, deploying the shock absorbers comprising:

extending the retractable supports to push the shock absorber away from the housing; and extending additional retractable supports to push a bumper on the shock absorbers away from a cover portion of the shock absorber to which the bumper is mounted.

12. The method of claim 11 further including retracting the shock absorbers after deploying the shock absorbers.

13. The method of claim 11 wherein sensing the movement of the electronic device comprises determining a duration of the movement.

14. The method of claim 11 further comprising:

providing an activation signal to trigger switches associated with the shock absorbers to deploy the shock absorbers by extending the retractable supports.

15. The method of claim 13 wherein extending the additional retractable supports comprises releasing detents on the cover portion that hold the bumper against the central portion.

16. The method of claim 11 wherein sensing the movement of the electronic device comprises determining a distance of the movement.

17. A portable electronic device, comprising:

a housing;

shock absorbers mounted on rigid supports that slide into and out of the housing;

a sensor within the housing, the sensor configured to detect movement of the housing;

a controller within the housing, the controller configured to determine a triggering event based upon the detected movement of the housing;

an activation mechanism coupled to the shock absorbers for deploying the shock absorbers based upon the triggering event determination.

* * * * *